3,385,853
PRODUCTION OF TRIS-(2-HYDROXYALKYL) ISOCYANURATES
David E. Scheirer and Elmer L. Nelson, Chester, Va., assignors to Allied Chemical Corporation, New York, N.Y., a corporation of New York
No Drawing. Filed Feb. 4, 1966, Ser. No. 525,152
8 Claims. (Cl. 260—248)

This invention relates to an improved process for the manufacture of tris-(2-hydroxyalkyl) isocyanurates.

The preparation of tris-(2-hydroxyalkyl) isocyanurate as the reaction product of an alkylene oxide and cyanuric acid is described in U.S. Patent 3,088,948, issued May 7, 1963. In accordance with the disclosure of that patent, which is incorporated herein by reference, tris-(2-hydroxyalkyl) isocyanurates are prepared by reacting cyanuric acid with an alkylene oxide containing at least 2 and preferably 2 to 4 carbon atoms at a temperature of about 25° to 140° C. in the presence of an inert solvent and an alkaline catalyst.

It is an object of the present invention to provide a more efficient and economical process for producing tris-(2-hydroxyalkyl) isocyanurates.

It is a further object of the present invention to provide a process for producing tris-(2-hydroxyalkyl) isocyanurates in increased yields.

Other objects and advantages of the present invention will be obvious from the following description.

It has been discovered that high yields of tris-(2-hydroxyalkyl) isocyanurates are obtained without the need for an alkaline catalyst or close control of pH when cyanuric acid is reacted with an alkylene oxide in the presence of an inert solvent containing controlled amounts of water.

More particularly, in accordance with the present invention tris-(2-hydroxyalkyl) isocyanurates are produced in high yields by reacting cyanuric acid with an alkylene oxide containing at least 2, preferably 2 to 4 carbon atoms at a temperature of about 25° to about 140° C. in the presence of an inert solvent for the cyanuric acid and alkylene oxide which solvent contains about 0.7% to about 10%, preferably about 1.5% to 4.5%, by weight, water.

It is the principal feature of the present invention that the water content of the inert solvent be maintained within the prescribed limits. It has been surprisingly found that yields of tris-(2-hydroxyalkyl)isocyanurates of 79% and higher are obtained, even without an alkaline catalyst and without close pH control, in the presence of water. Furthermore, it has been found that when the water content is about 1.5% to 4.5% unusually high yields amounting to 90% of theory, or more, are obtained.

The process of the present invention is suitably carried out using about 2 to 5, preferably about 3 to 4 mols of alkylene oxide per mol of cyanuric acid. When the process is carried out batch wise, the 3:1 mol ratio is most preferable since it makes possible the obtainment of maximum yields without necessitating the handling of large amounts of unreacted alkylene oxide. On the other hand, when the process is carried out continuously, a slightly higher mol ratio i.e. about 4:1 is more preferable in order to assure ample opportunity for the cyanuric acid to react. In a continuous process the unreacted alkylene oxide is recycled to react with additional cyanuric acid. It will be understood that in any given case in order to assure reaction in the stoichiometrical 3:1 ratio, the optimum ratio of reactants fed to the reactor will depend on the reaction temperature and retention time as well as the size and shape of the reaction vessel, the last being particularly true in regard to a continuous process.

Examples of suitable alkylene oxides are, ethylene oxide, propylene oxide and butylene oxide.

The preferred solvent for the process is dimethyl formamide, although other lower dialkyl form amides will also give very good results. Other suitable inert solvents which dissolve both cyanuric acid and alkylene oxides include N-alkyl morpholine, N-alkyl oxazolidone-2 in which the alkyl atom contains 1 to 4 carbon atoms, dimethyl sulfoxide, formamide and diethyl carbonate. Sufficient solvent should be employed to at least partially dissolve the cyanuric acid. A slurry of 5 to 30% by weight cyanuric acid preferably 10 to 20% by weight in the solvent has been found to be advantageous. With higher concentrations of cyanuric acid the viscosity of the resulting slurry increases making pumping and stirring increasingly difficult.

When temperatures below 25° C. are employed the reaction between the alkylene oxide and the cyanuric acid proceeds very slowly. On the other hand, when temperatures above about 140° C. are used decomposition of the product occurs resulting in substantially reduced yields. The preferred temperature range for carrying out the process of the present invention is about 100° to 140° C.

Pressure is not critical and atmospheric or superatmospheric pressure may be employed. Pressures between atmospheric and about 100 p.s.i.g. are preferred.

The reaction may be carried out over a period of time ranging from about 30 minutes to a week depending upon the reaction temperature. Using the preferred temperatures a reaction time of about 3 hours is most suitable for batch processes. Shorter reaction times are suitable when the process is carried out on the continuous basis using an excess of alkylene oxide.

After the reaction is complete the reaction mass is cooled to below the temperature at which substantial further reaction will take place, e.g. to about 65° C. or lower, and the solvent is removed, e.g. by vacuum flash distillation, leaving the desired product as residue. The solvent is advantageously reused to dissolve additional cyanuric acid.

As already pointed out, close control of pH is not necessary. Satisfactory yields are obtained at reaction pH between 4.5 and 8. However, if the solvent is recycled in the process, it is advisable to pass it through a bed of alkaline material, e.g. caustic pellets, to neutralize any acid contaminants that may have been formed during the process.

The following examples are given in order to illustrate the invention without being intended to limit it. Unless otherwise indicated, parts are by weight and temperatures are in degrees centrigrade.

Example I

A total of 460 parts of recycled dimethyl formamide (DMF) containing 2.5% $H_2O$ was passed through a bed of NaOH pellets into a jacketed reactor equipped with agitator and reflux condenser and was heated to 105° to 110° C. A total of 75 parts of cyanuric acid (98.5% assay) was then charged to the reactor. When the resulting slurry reached 105° to 110° C., 78 parts of ethylene oxide was gradually introduced below the surface of the reaction mixture over a period of 2¼ hours. Temperature was maintained at 105° to 110° C. and pressure at 10 p.s.i.g. After completion of the ethylene oxide addition, the reaction temperature was maintained at 105° to 110° C. for an additional ½ hour to insure complete reaction. The reaction mixture was then cooled to 50° C. The DMF solvent was removed by vacuum evaporation in a thin film evaporator operating at 140° C. and 10 mm. Hg pressure. The resulting product was removed from the evaporator as a melt; it analyzed 89% tris-(2-hydroxyethyl) isocyanurate (THEIC). Yield was 90.5% of theory based on cyaniuric acid fed.

Example II

A run was made under the same condition as in Example I except that the $H_2O$ content of the DMF solvent was decreased from 2.5% to 0.7%. In this run the product removed from the evaporator as a melt analyzed 84% THEIC. Yield was 85.5% of theory based on cyanuric acid fed.

Example III

A run was made under the same conditions as in Example I except the $H_2O$ content of the DMF solvent used was increased from 2.5% to 6%. In this run the product removed from the evaporator as a melt analyzed 78% THEIC. Yield was 79.5% of theory based on cyanuric acid fed.

We claim:

1. In the process wherein cyanuric acid is reacted with an alkylene oxide in the presence of an inert solvent to produce a tris-(2-hydroxyalkyl) isocyanurate the improvement which comprises maintaining an amount of water in said solvent in the range of about 0.7% to 10% by weight of the solvent.

2. The process of claim 1 wherein the amount of water is about 1.5% to about 4.5% by weight.

3. The process of claim 1 wherein the mol ratio of alkylene oxide to cyanuric acid is in the range 2:1 to 5:1 and the reaction temperature is in the range 25° to about 140° C.

4. The process of claim 3 wherein the mol ratio of alkylene oxide to cyanuric acid is in the range 3:1 to 4:1.

5. The process of claim 1 wherein the alkylene oxide is a member of the group consisting of ethylene oxide, propylene oxide and butylene oxide.

6. The process of claim 1 wherein the solvent is dimethyl formamide.

7. The process of claim 3 wherein the temperature is in the range 100° to 140° C.

8. The process for producing tris-(2-hydroxyethyl) isocyanurate which comprises introducing ethylene oxide into a mixture comprising dimethyl formamide containing dissolved cyanuric acid and about 1.5% to about 4.5% water, by weight, and at a temperature in the range 100° to 140° C. and a pH between 4.5 and 8, until 3 mols of ethylene oxide have been introduced per mol of cyanuric acid in said mixture, and recovering tris-(2-hydroxyethyl) isocyanurate.

References Cited

UNITED STATES PATENTS

| | | | |
|---|---|---|---|
| 3,088,948 | 5/1963 | Little et al. | 260—248 |
| 3,265,694 | 8/1966 | Walles et al. | 260—248 |
| 3,293,224 | 12/1966 | Fitz-William | 260—248 XR |

JOHN D. RANDOLPH, *Primary Examiner.*

J. M. FORD, *Assistant Examiner.*